United States Patent Office 2,727,864
Patented Dec. 20, 1955

2,727,864
METHOD OF TREATING LUMINOUS MATERIALS

Georg Kressin, Berlin-Frohnau, Germany, assignor to Patent-Treuhand-Gesellschaft für Elektrische Glühlampen m. b. H., Heidenheim (Brenz), Germany No Drawing. Application July 9, 1951,
Serial No. 235,899

Claims priority, application Germany July 12, 1950

15 Claims. (Cl. 252—301.4)

This invention relates to a method of preventing the veiling of luminescent coatings in electric gaseous discharge lamps by treating the luminescent material, prior to its application to the discharge lamp, with an oxyhalide compound.

Electric gaseous discharge lamps, particularly the low pressure mercury discharge lamps, are subject to a steady depreciation of luminous output over a period of time, with a considerable reduction in its luminous flux after about 20 to 100 hours. This loss in luminous flux is due principally to the deposition of black mercury oxide upon the surface of the luminous coating during the burning hours of the lamp. The mercury oxide is probably formed by a chemical reaction between the mercury ions and oxygen ions supplied continuously, although in small quantities, by the oxide electrode during electrolysis for instance.

Applicant has solved this problem by treating the luminescent material after it has been fired with a suitable oxyhalide compound per se or together with the corresponding oxide. The oxyhalide compounds utilized must be capable of reacting with the mercury oxide deposit to form colorless compounds, thereby preventing the veiling due to the deposition of mercury oxide.

Accordingly, an object of the invention is the development of a novel process of preventing veiling in gaseous electric discharge lamps.

Another object of this invention is the development of a novel process of treating luminescent materials.

Still another object of this invention is the obtention of a treated luminous material having a durable, high luminous flux.

Further objects and advantages of the present invention will be apparent from the following description.

It has now been discovered that veiling of the luminescent coating due to the deposition of mercury oxide thereon, thereby resulting in a steady decline of the luminous flux of electric discharge lamps, can be avoided substantially completely by adding a suitable oxyhalide compound per se or together with the corresponding oxide, to the fired luminescent material. These oxyhalide compounds must be capable of reacting with the mercury oxide to form colorless compounds. Particularly suitable compounds for the reaction are the oxychlorides of antimony, arsenic and bismuth as well as the oxychlorides of the members of the first group of the periodic table, although the other halides can also be used. The reaction that occurs as exemplified by the antimony oxychloride (SbOCl) is feasible, due to the basic character of the mercurous oxide ($Hg_2O$), the basicity of which is comparable to the alkalis.

$$Hg_2O + 2SbOCl \rightarrow Sb_2O_3 + Hg_2Cl_2$$

This reaction occurs on the inner surface of the envelope of the discharge tube, converting the black mercurous oxide into the colorless mercurous chloride ($Hg_2Cl_2$) and the almost colorless antimony trioxide ($Sb_2O_3$), which has a slight yellow tinge.

Another embodiment of this invention is the utilization of a mixture of the oxychloride with the corresponding oxide such as a mixture of SbOCl and $Sb_2O_3$. Particularly favorable results are obtained with about 1–30% by weight of the oxychloride and preferably about 12% by weight, based on the weight of the mixture, although higher or lower amounts of the oxychloride can also be utilized.

Several methods may be employed in treating the luminescent materials with the oxychloride per se or admixed with the corresponding oxide. The treating agent may be intimately admixed with the fired luminescent material by mechanical means prior to the application of the treated luminescent material as a coating in gaseous electric discharge lamps. The preferred method, however, consists essentially in adding antimony, arsenic, bismuth, etc., in the form of the trichloride solution into an ammoniacal suspension of the luminescent material. This latter method provides both the oxychloride and the oxide of the metal as treating agents for the luminescent material. The oxychloride herein deposits upon the surface of the luminescent crystals in the form of a very fine uniform coating, by means of a colloidal effect, thereby providing a more effective protective coating upon each luminescent crystal than produced when utilizing mechanical means of mixing the oxychloride compound with the luminescent material.

Satisfactory results are obtained with any amount of treating agent. However, the preferred range of oxychloride or combined oxychloride and oxide is about 0.1–5.0% by weight of the luminescent material and the preferred specfic amount is about 0.5% by weight of the material to be treated.

The method of this invention is applicable to any luminescent material. The silicates such as zinc-beryllium-silicate, the halophosphates, etc., are capable of being protected against veiling in accordance with the aforedescribed method. The treated luminescent materials exhibit only a small loss in the luminous flux of a low-pressure mercury discharge lamp in direct contrast with the unprotected luminescent materials. Experimental tests on luminescent materials applied to the inner wall of a low pressure discharge lamp which normally exhibit a decrease in the luminous output of about 20–30%, show only a maximum loss of about 5%, when treated and protected with the oxychloride or a mixture of the oxychloride and the oxide.

The following example is additionally illustrative of the present invention and is not to be considered as limiting the scope thereof.

Example 5 grams of $Sb_2O_3$ are dissolved in 30–40 cc. of HCl (of a density of 1.19). 1 kg. of a luminescent material consisting essentially of Zn-Be-silicate which has already been fully fired in any well-known manner is suspended in about 10 litres of 1–2 per cent $NH_4OH$. The above obtained $SbCl_3$ solution is added thereto with vigorous stirring and is then filtered. The product thus obtained is washed 4–5 times with distilled water, dried at about 250° C. and sifted.

While the invention has been described with reference to specific embodiments, it will be apparent to those skilled in the art that various modifications may be made and equivalents substituted therefor without departing from the principles and true nature of the present invention.

What is claimed by Letters Patent is:

1. A luminescent coating composition for application to the interior of low-pressure mercury discharge lamps, comprising a fired luminescent material having intimately admixed therewith and distributed therethrough an oxyhalide selected from the group consisting of oxychlorides of antimony, arsenic and bismuth in an amount sufficient to react with the mercury oxide formed during discharge of the lamp and form therewith substantially transparent compounds, preventing formation of an opaque mercury oxide coating on the surface of the lamp, thus preventing loss in luminous flux of the lamp.

2. A luminescent coating composition for application to the interior of low-pressure mercury discharge lamps, comprising a fired luminescent material having intimately admixed therewith and distributed therethrough an oxyhalide selected from the group consisting of oxychlorides of antimony, arsenic and bismuth and the corresponding oxide of said oxyhalide in an amount sufficient to react with the mercury oxide formed during discharge of the lamp and form therewith substantially transparent compounds, preventing formation of an opaque mercury oxide coating on the surface of the lamp, thus preventing loss in luminous flux of the lamp.

3. A luminescent coating composition for application to the interior of low-pressure mercury discharge lamps, comprising a fired luminescent material having intimately admixed therewith and distributed therethrough an oxyhalide selected from the group consisting of oxychlorides of antimonoy, arsenic and bismuth in an amount of 0.1–5.0% by weight oxyhalide to the weight of luminescent material.

4. A luminescent coating composition for application to the interior of low-pressure mercury discharge lamps, comprising a fired luminescent material having intimately admixed therewith and distributed therethrough an oxyhalide selected from the group consisting of oxychlorides of antimony, arsenic and bismuth in an amount of 0.5% by weight oxyhalide to the weight of luminescent material.

5. A luminescent coating composition for application to the interior of low-pressure mercury discharge lamps, comprising a fired luminescent material having intimately admixed therewith and distributed therethrough an oxyhalide selected from the group consisting of oxychlorides of antimony, arsenic and bismuth and the corresponding oxide of said oxyhalide in an amount of 0.1–5.0% by weight of said oxyhalide and said corresponding oxide to the weight of said fired luminescent material, said oxyhalide being present in an amount sufficient to react with the mercury oxide formed during discharge of the lamp and form therewith substantially transparent compounds.

6. A luminescent coating composition for application to the interior of low-pressure mercury discharge lamps, comprising a fired luminescent material having intimately admixed therewith and distributed therethrough an oxyhalide selected from the group consisting of oxychlorides of antimony, arsenic and bismuth and the corresponding oxide of said oxyhalide in an amount of 0.1–5.0% by weight of said oxyhalide and said corresponding oxide to the weight of said fired luminescent material, said oxyhalide constituting about 1–30% by weight of the mixture of said oxyhalide and said corresponding oxide.

7. A process of producing a luminescent coating composition for application to the interior of low-pressure mercury discharge lamps, comprising the steps of mixing with an ammoniacal suspension of a fired luminescent material a trichloride solution of a substance selected from the group consisting of antimony, arsenic and bismuth while agitating so as to form the oxychloride and oxide of said substance and deposit the same on the surface of said fired luminescent material, the amount of trichloride solution, the chloride content thereof and said fired luminescent material being such that the thus formed oxychloride of said substance is in an amount sufficient to react with the mercury oxide formed during discharge of a low pressure mercury discharge lamp containing said fired luminescent material and form therewith substantially transparent compounds; and recovering the thus formed luminescent coating composition.

8. A process of producing a luminescent coating composition for application to the interior of low-pressure mercury discharge lamps, comprising the steps of mixing with an ammoniacal suspension of a fired luminescent material a trichloride solution of a substance selected from the group consisting of antimony, arsenic and bismuth while agitating so as to form the oxychloride and oxide of said substance and deposit the same on the surface of said fired luminescent material, the amount of trichloride solution and said fired luminescent material being such that the thus formed oxychloride and oxide of said substance is 0.1–5.0% by weight of said fired luminescent material and the chloride content of said solution being such that said formed oxychloride of said substance is in an amount sufficient to react with the mercury oxide formed during discharge of a low pressure mercury discharge lamp containing said fired luminescent materials and form therewith substantially transparent compounds; and recovering the thus formed luminescent coating composition.

9. A process of producing a luminescent coating composition for application to the interior of low-pressure mercury discharge lamps, comprising the steps of mixing with an ammoniacal suspension of a fired luminescent material a trichloride solution of a substance selected from the group consisting of antimony, arsenic and bismuth while agitating so as to form the oxychloride and oxide of said substance and deposit the same on the surface of said fired luminescent material, the amount of trichloride solution and said fired luminescent material being such that the thus formed oxychloride and oxide of said substance is 0.1–5.0% by weight of said fired luminescent material, the chloride content of said trichloride solution being adjusted to correspond to about 1–30% of the formed oxychloride to the weight of the formed oxide; and recovering the thus formed luminescent coating composition.

10. A process of producing a luminescent coating composition for application to the interior of low-pressure mercury discharge lamps, comprising the steps of mixing with an ammoniacal suspension of a fired luminescent material a trichloride solution of a substance selected from the group consisting of antimony, arsenic and bismuth while agitating so as to form the oxychloride and oxide of said substance and deposit the same on the surface of said fired luminescent material, the amount of trichloride solution and said fired luminescent material being such that the thus formed oxychloride and oxide of said substance is 0.5% by weight of said fired luminescent material, the chloride content of said trichloride solution being adjusted to correspond to about 12% of the formed oxychloride based on the weight of the formed mixture; and recovering the thus formed luminescent coating composition.

11. A luminescent coating composition for application to the interior of low-pressure mercury discharge lamps, comprising a fired luminescent material having intimately admixed therewith and distributed therethrough a substance belonging to the group consisting of an oxyhalide selected from the group consisting of oxychlorides of antimony, arsenic and bismuth and said oxyhalide mixed with the corresponding oxide of said oxyhalide, in an amount sufficient to react with the mercury oxide formed during discharge of the lamp and form therewith substantially transparent compounds, preventing formation of an opaque mercury oxide coating on the surface of the lamp, thus preventing loss in luminous flux of the lamp.

12. A luminescent coating composition for application to the interior of low pressure mercury discharge lamps, comprising a fired luminescent material having intimately admixed therewith and distributed therethrough antimony oxychloride in an amount sufficient to react with the mercury oxide formed during the discharge of the lamp and form therewith substantially transparent compounds, preventing formation of an opaque mercury oxide coating on the surface of the lamp, thus preventing loss in luminous flux of the lamp.

13. A luminescent coating composition for application to the interior of low pressure mercury discharge lamps, comprising a fired luminescent material having intimately admixed therewith and distributed therethrough antimony oxychloride in an amount of 0.1–5.0% by weight of the weight of said luminescent material.

14. A luminescent coating composition for application to the interior of low pressure mercury discharge lamps, comprising a fired luminescent material having intimately admixed therewith and distributed therethrough antimony oxychloride in an amount of 0.5% by weight of the weight of said luminescent material.

15. A luminescent coating composition for application to the interior of low pressure mercury discharge lamps, comprising a fired luminescent material having intimately admixed therewith and distributed therethrough antimony oxychloride and antimony oxide in an amount of 0.1–5.0% by weight of said fired luminescent material, said antimony oxychloride constituting about 1–30% by weight of the mixture of said antimony oxychloride and said antimony oxide.

References Cited in the file of this patent

UNITED STATES PATENTS

| | | |
|---|---|---|
| 2,226,404 | Jenkins | Dec. 24, 1940 |
| 2,607,014 | Roy | Aug. 12, 1952 |